(12) United States Patent
Straka et al.

(10) Patent No.: US 7,513,322 B2  
(45) Date of Patent: Apr. 7, 2009

(54) REVERSE OPERATION SAFETY CIRCUIT

(75) Inventors: David A. Straka, Hudson, OH (US); Arthur James Harvey, Mantua, OH (US); Ted Wetzel, Mayfield, OH (US)

(73) Assignee: Delta Systems, Inc., Streetsboro, OH (US)

( * ) Notice: Subject to any disclaimer, the term of this patent is extended or adjusted under 35 U.S.C. 154(b) by 0 days.

(21) Appl. No.: 12/022,464

(22) Filed: Jan. 30, 2008

(65) Prior Publication Data

US 2008/0143193 A1  Jun. 19, 2008

Related U.S. Application Data

(62) Division of application No. 11/763,762, filed on Jun. 15, 2007, now Pat. No. 7,422,078, which is a division of application No. 11/076,338, filed on Mar. 9, 2005, now Pat. No. 7,237,633.

(51) Int. Cl.  
    *B60K 25/08* (2006.01)
(52) U.S. Cl. ..................................... 180/53.6
(58) Field of Classification Search ............... 318/281, 318/282; 307/328, 10.6, 116, 326; 180/53.6, 180/273, 271, 53.1, 53.61, 53.62; 56/10.8; 172/74, 79, 83

See application file for complete search history.

(56) References Cited

U.S. PATENT DOCUMENTS

| | | | |
|---|---|---|---|
| 5,866,954 A * | 2/1999 | Daniel et al. .............. 307/10.1 |
| 5,994,857 A | 11/1999 | Peterson et al. | |
| 6,056,074 A * | 5/2000 | Heal et al. ................. 180/6.48 |
| 6,109,010 A | 8/2000 | Heal et al. | |
| 6,154,364 A * | 11/2000 | Girrens et al. .............. 361/704 |
| 6,316,891 B1 | 11/2001 | Hough | |
| 6,411,045 B1 * | 6/2002 | Nerone ...................... 315/291 |
| 6,437,458 B1 | 8/2002 | Baggett | |
| 6,720,679 B2 | 4/2004 | Harada et al. | |
| 7,131,509 B2 * | 11/2006 | Harvey et al. .............. 180/53.6 |
| 2004/0026138 A1 * | 2/2004 | Shoemaker ................ 180/53.6 |
| 2004/0124026 A1 | 7/2004 | Walters et al. | |
| 2004/0201286 A1 | 10/2004 | Harvey et al. | |
| 2005/0262819 A1 * | 12/2005 | Weber et al. ................. 56/10.8 |
| 2005/0274098 A1 * | 12/2005 | Weber et al. ............. 56/10.2 R |

* cited by examiner

*Primary Examiner*—Árpád Fábián-Kovács  
(74) *Attorney, Agent, or Firm*—Tarolli, Sundheim, Covell & Tummino LLP (57) ABSTRACT

A control circuit for a lawn tractor having an engine and a power take off driven implement. The control circuit includes an inhibit circuit component for preventing operation of a power take off driven implement with the tractor in reverse. Two versions of the inhibit circuit are disclosed, one grounds an engine magneto and a second disables an electric clutch for coupling the power take off to the driven element. The circuit includes first and second override switches and an override circuit component that allows operation of a power take off driven implement while the lawn tractor is in reverse after the first and second override switches are activated in a proper order by a tractor operator.

6 Claims, 6 Drawing Sheets

Fig.6C

REVERSE OPERATION SAFETY CIRCUIT

RELATED APPLICATIONS

This application is a divisional of U.S. patent application Ser. No. 11/763,762, filed on Jun. 15, 2007 now U.S. Pat. No. 7,422,078 which is a division of application Ser. No. 11/076, 338, filed Mar. 9, 2005, now U.S. Pat. No. 7,237,633 issued Jul. 3, 2007.

FIELD OF THE INVENTION

The present invention relates generally lawn and garden tractors and similar vehicles. In particular, the present invention relates to a reverse operation safety circuit for such a vehicle.

BACKGROUND OF THE INVENTION

Vehicles such as some lawn and garden tractors have power take offs (PTOs) that are used to drive implements such as mower blades. Prior lawn and garden tractors with PTOs have included interlock circuits that prevent engagement of the PTO driven implement when the vehicle is in reverse. Under certain conditions, operation of a PTO driven implement while the vehicle is in reverse is desirable. Various override systems have been proposed that allow operation of a PTO driven implement in reverse.

Override systems have been developed that use a momentary over-ride switch that latches an over-ride relay. The over-ride relay is unlatched when certain other conditions are met, like shifting out of reverse. One problem with override systems that rely on relays is that relays can stick in a closed state or the relay may not may not connect when energized. Use of multiple relays and implementing time delays can result in complex, expensive and difficult to service override systems.

One proposed system uses a four-position ignition switch (Off, Run with over-ride on, Run with over-ride off, and Start). In that system the user must turn the key to the start position to start the engine, thus resetting the over-ride on engine restart. The ignition switch spring returns the key from the Start position to the Run with over-ride off position, requiring an additional intentional movement of the key by the user to select Run with over-ride on option.

United States published application 2004-0201286 to Harvey et al. entitled "Reverse Operation Safety Circuit" concerns a safety system for a riding lawn mower that prevents powered operation of a PTO driven implement while the tractor is in reverse unless an override switch is "ON". The override switch may be a sustained action two position switch and the PTO driven implement may be a lawn mower blade. In one embodiment, the override switch does not allow the engine to start if the override switch is on. In one embodiment, the override switch cooperates with an operator presence switch to prevent operation of the PTO driven implement when the override switch is on and the operator is not present. The disclosure of this published application to Harvey et al. is incorporated herein by reference.

SUMMARY

The present invention concerns a safety system for a riding lawn mower that prevents powered operation of a PTO driven implement if the tractor is shifted to reverse unless an override condition has been established.

An exemplary control circuit for a lawn tractor includes an inhibit circuit component for preventing operation of a power take off driven implement with the tractor in reverse and first and second override switches. An override circuit component allows operation of a power take off driven implement while the lawn tractor is in reverse after the first and second override switches are activated by a tractor operator.

In a preferred exemplary embodiment, the control circuit, an override switch and an indicator are all mounted on a single circuit board. In accordance with another aspect of the preferred exemplary embodiment, this circuit board is part of an ignition module that mounts to a riding lawnmower dash board and which includes a second of the two override switch contacts.

Additional features of the invention will become apparent and a fuller understanding will be obtained by reading the following detailed description in connection with the accompanying drawings.

DETAILED DESCRIPTION OF THE INVENTION

Figure 1:
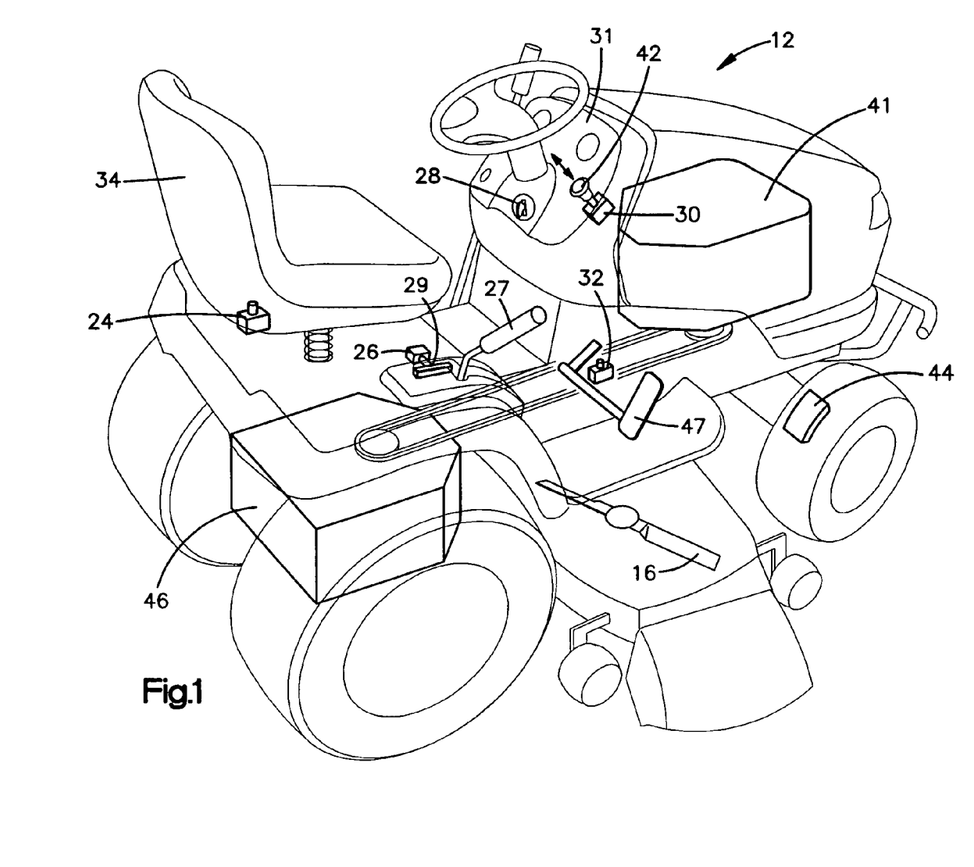
FIG. 1 is an illustration of a lawn and garden tractor equipped with a reverse operation override switch and additional safety switches.

FIG. 1 illustrates a lawn and garden tractor 12 that allows operation of a PTO driven implement 16 when the tractor is in reverse. In the illustrated embodiment, the PTO driven implement 16 is a mower blade. It should be readily apparent that the circuit 100 (FIGS. 6A-6C) discussed below could be applied to other PTO driven implements. For example, the PTO driven implement could be a snow thrower. In the exemplary embodiment, the tractor 12 implements a mow in reverse capability using a plurality of switches. The system illustrated by FIG. 1 includes an operator presence switch 24, a reverse switch 26, a multi-position ignition switch 28, a PTO switch 30, and an engagement switch 32.

Figure 2:
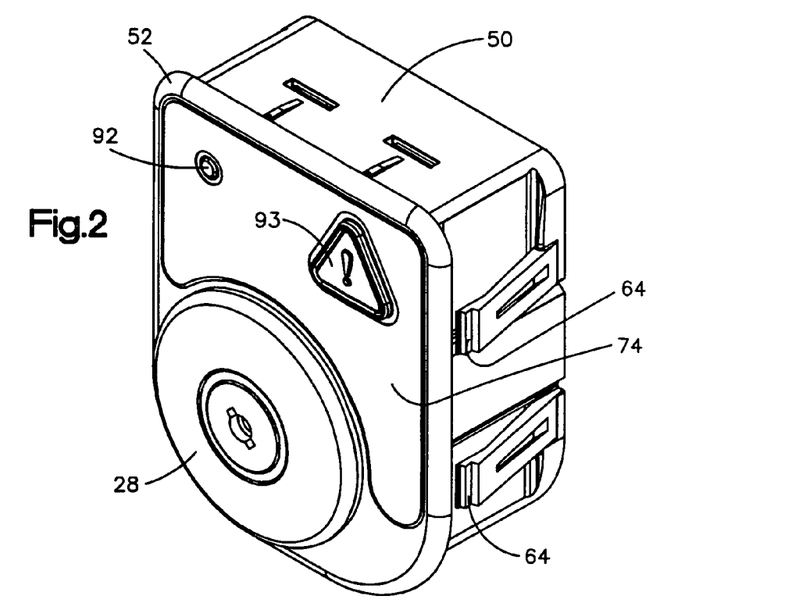
FIG. 2 is a perspective view of an ignition switch module or housing that supports a multi-position ignition switch and reverse operation safety circuit.

The illustrated operator presence switch 24 is positioned below a seat 34 to sense the presence of an operator on the seat. In the illustrated embodiment, a lever 27 controls whether the lawn and garden tractor is in "Forward" or "Reverse." An actuator 29 of the illustrated reverse sensing switch 26 is in communication with the lever, such that the position of the actuator 29 indicates whether the lawn and garden tractor is in "Forward" or "Reverse." Referring to FIG. 2, the illustrated ignition switch 28 is a multi-contact key switch supported by a module 50 that mounts to a tractor dashboard 31. When the ignition key is moved to a start position a set of ignition switch contacts close to selectively energize a starter motor with voltage from a battery 38 (FIG. 6C) to start the engine 41. In the exemplary embodiment, the ignition switch 28 closes a path between the battery 38 and a starter solenoid to energize the starter motor with the battery 38.

On some lawn and garden tractors, movement of an actuator 42 of the PTO switch 30 between an "ON" position and an "OFF" position causes engagement and disengagement of the PTO driven implement respectively. On these tractors, a PTO switch 30 is coupled to a powered actuator or clutch that engages and disengages the PTO driven implement based on the position of the PTO switch actuator. On other lawn and garden tractors, the PTO driven implement 16 is engaged and disengaged by a manual movement of a mechanical PTO engagement linkage. On these tractors, the PTO switch actuator is moved by movement of the PTO engagement linkage and thereby senses engagement and disengagement of the PTO driven implement. An engagement switch 32 senses engagement of a brake 44 and/or engagement of a drive transmission 46. In the illustrated embodiment, a single switch senses the position of a pedal 47 that engages the brake and disengages the transmission 46 when depressed. In another embodiment, separate switches sense engagement of the brake and the transmission.

FIGS. 2-5 illustrate details of the ignition switch module 50. The module includes a dashboard engaging lip 52 that extends circumferentially around an outer perimeter of the module. A module housing defines a cavity bounded by a rectangular top surface 54, a curved bottom surface 56, and two side surfaces 58, 60. Flexible fingers 62 on the sides have latches 64 at their ends for securing the module to the dashboard.

Figures 5, 5A, 5B:
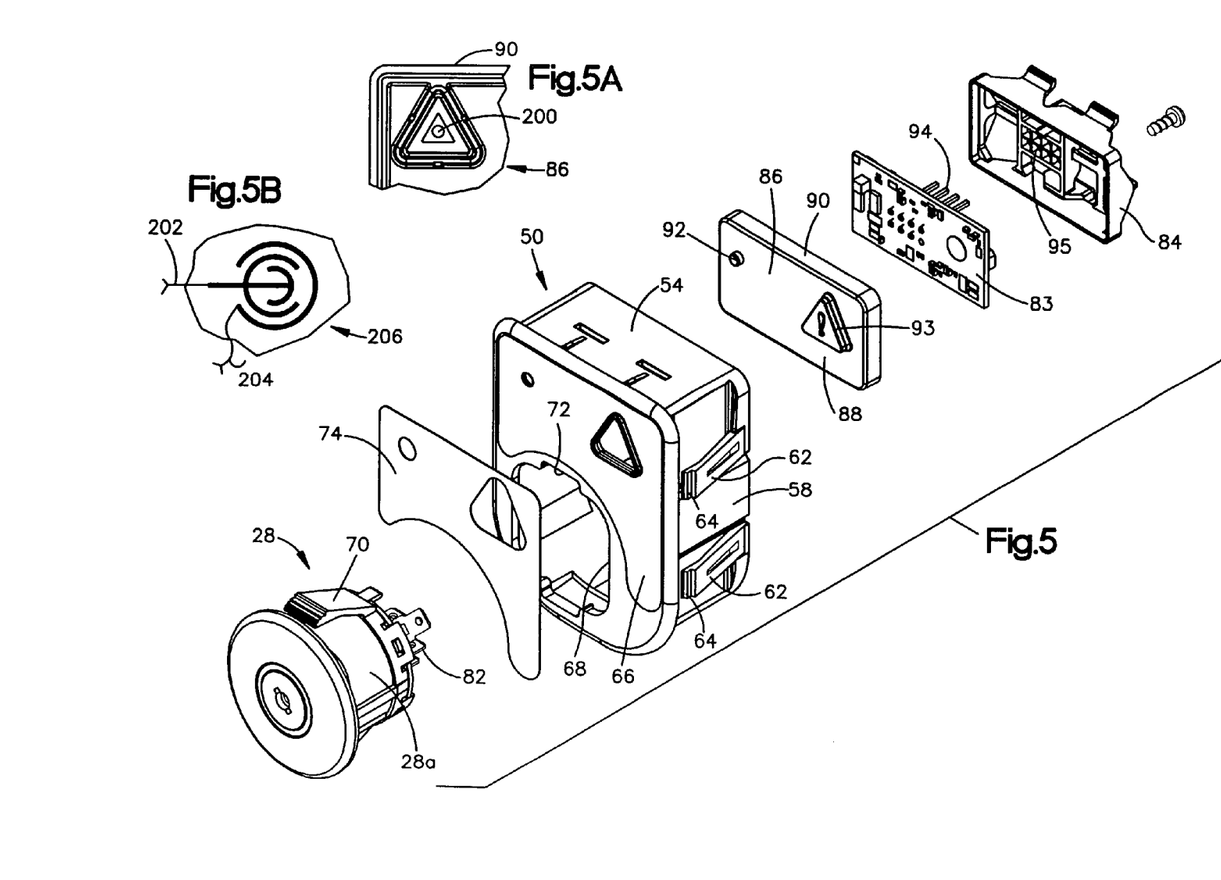
FIG. 5 is an exploded perspective assembly view of the ignition switch module of FIG. 2.
FIG. 5A is an enlarged plan view of a portion of a gasket for use with the exemplary embodiment of the invention.
FIG. 5B is an enlarged view of a portion of the conductive trace on a circuit board used with an exemplary embodiment of the invention.

An assembly view of the switch module 50 is illustrated in FIG. 5. As seen in that figure, the module 50 has a front or outwardly facing surface 66 that defines a cutout 68. During assembly of the module 50 the ignition switch 28 is pushed through the cutout 68 so that latches 70 of a switch housing 28a seat within corresponding notches 72 defined by the cutout 68. A faceplate 74 bounds portion of the cutout 68 and is applied to the front surface 66 of the module. This faceplate includes indicia that conveys information to an operator regarding operation of the ignition switch 28.

Figure 3:
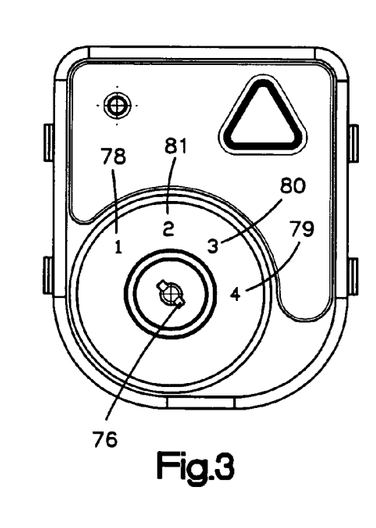
FIG. 3 is a front plan view of the ignition switch module of FIG. 2.
Figure 4:
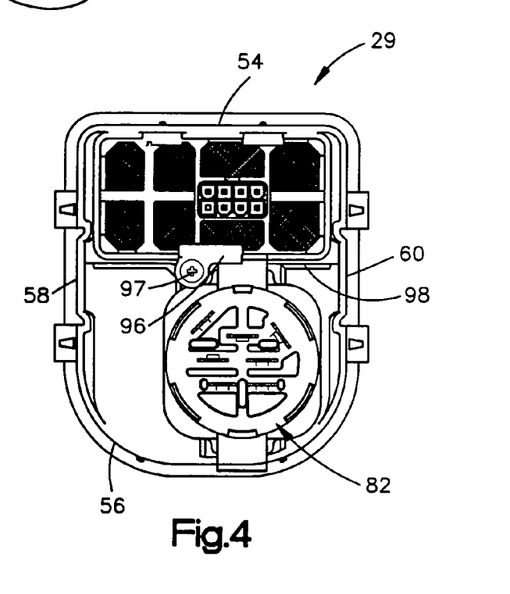
FIG. 4 is a rear plan view of the ignition switch module of FIG. 2.

The exemplary ignition switch 28 is a four position switch having a key slot 76 for insertion of a key for turning on the tractor. As illustrated in FIG. 3, the key slot is oriented in a stop position 78. Three other positions or key orientations are start 79, run 80, and a run with reverse override 81. The switch includes a plurality of switch contacts 82 on a back side of the switch 28 that are exposed for coupling to circuitry when the module 50 is mounted to the lawn mower dash board 31. In the start position of the ignition switch, these contacts complete a circuit that energizes a starter motor by applying a battery voltage to the tractor's starter solenoid.

The module 50 supports a printed circuit board 83 that is supported within a module interior by a molded plastic carrier 84. Overlying the circuit board 83 is a flexible rectangular gasket or membrane 86 having a front surface 88 that is positioned between an inner surface of the module's interior and a forward facing surface of the printed circuit board 83. The gasket has a lip 90 that overlies a corresponding outer border of the carrier 84. When pushed into the module, the outer border of the gasket is compressed against the circuit board and impedes water in the region of the module from leaking into contact with the printed circuit board.

The gasket has two raised portions 92, 93 that are visible through cutouts in the module 50. A first raised portion covers a light emitting diode that is activated when the tractor is in an override condition. A second raised portion includes a warning indicia and overlies a pushbutton override switch 130 that forms part of the circuit 100 depicted in FIGS. 6A-6C. During assembly of the module 50 a number of circuit contacts 94 that extend rearwardly from the printed circuit board 83 are pushed through openings of a male connector 95 formed integrally with the carrier 84. A female connector engages this connector 95 to couple the circuit 100 to other circuit components of the tractor. A tab 96 integral with the carrier 84 extends downward and includes an opening through which a connector 97 extends. The exemplary connector 97 is a screw that threads into a boss (not shown) in the module housing. The gasket, printed circuit board, and carrier all fit within a cavity defined by a generally horizontal ledge 98 in the module housing that extends across the width of that housing.

The disclosed circuit 100 implements a dual motion override. Battery power is applied to the circuit 100 when the ignition is switched or moved from the stop position 78. Use of the driven implement 16 while moving in reverse requires moving the ignition switch to the override position 81 and then activating a push button switch 130 before shifting to reverse. If this dual motion process is not performed, putting the tractor into reverse with the engine running will deactivate the power take off implement 16. In a tractor having a manual clutch, the exemplary circuit shorts the engine magneto and in a so-called electric clutch configuration, the circuit 100 energizes a relay to disengage the electric clutch while allowing the engine to run. The term "mow in reverse" is used herein to describe this override condition because in the exemplary embodiment the driven element 16 is a riding tractor mower blade.

Figure 6A:
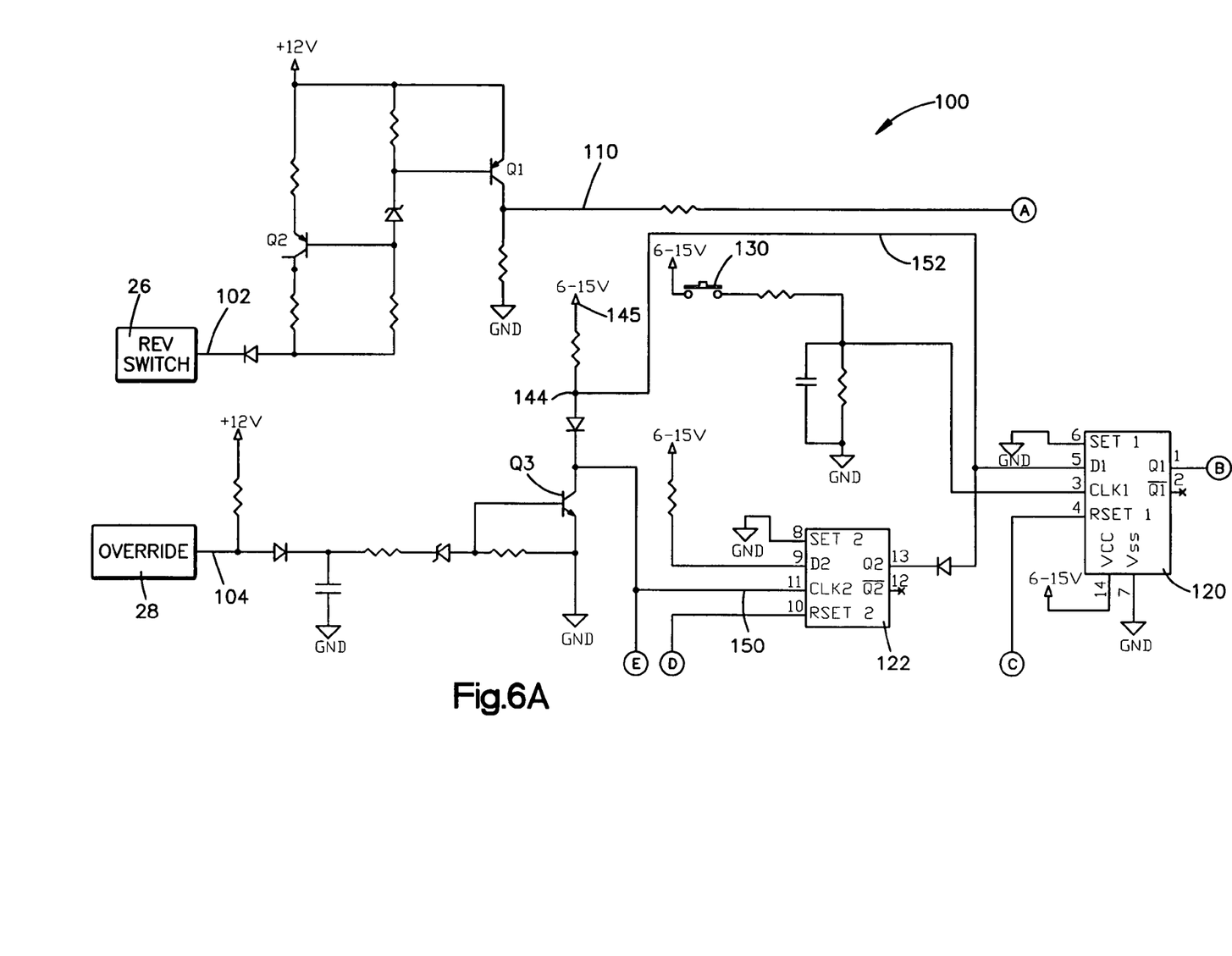
FIGS. 6A-6C are circuit schematics of an override circuit for use with the present invention.
Figure 6B:
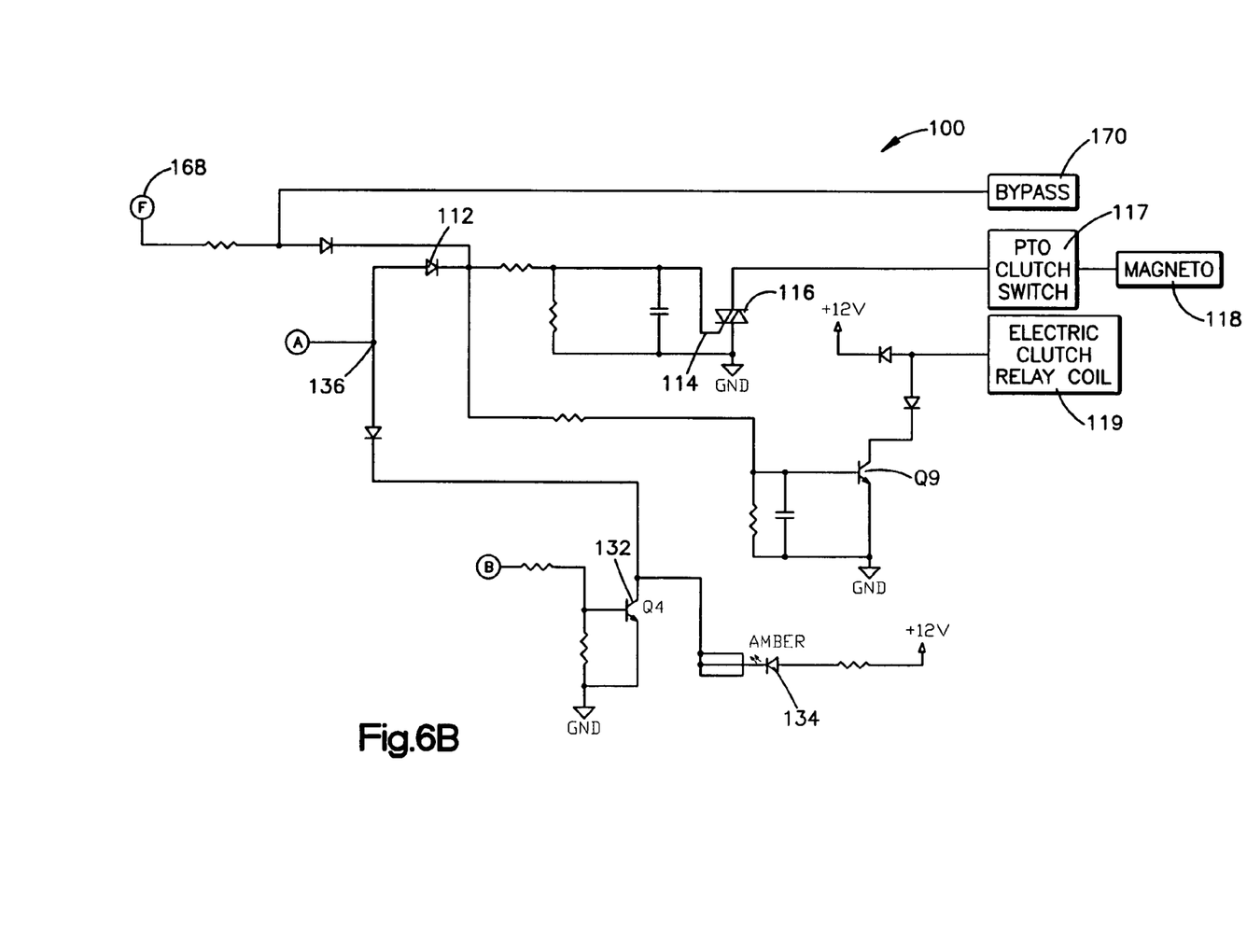
Figure 6C:
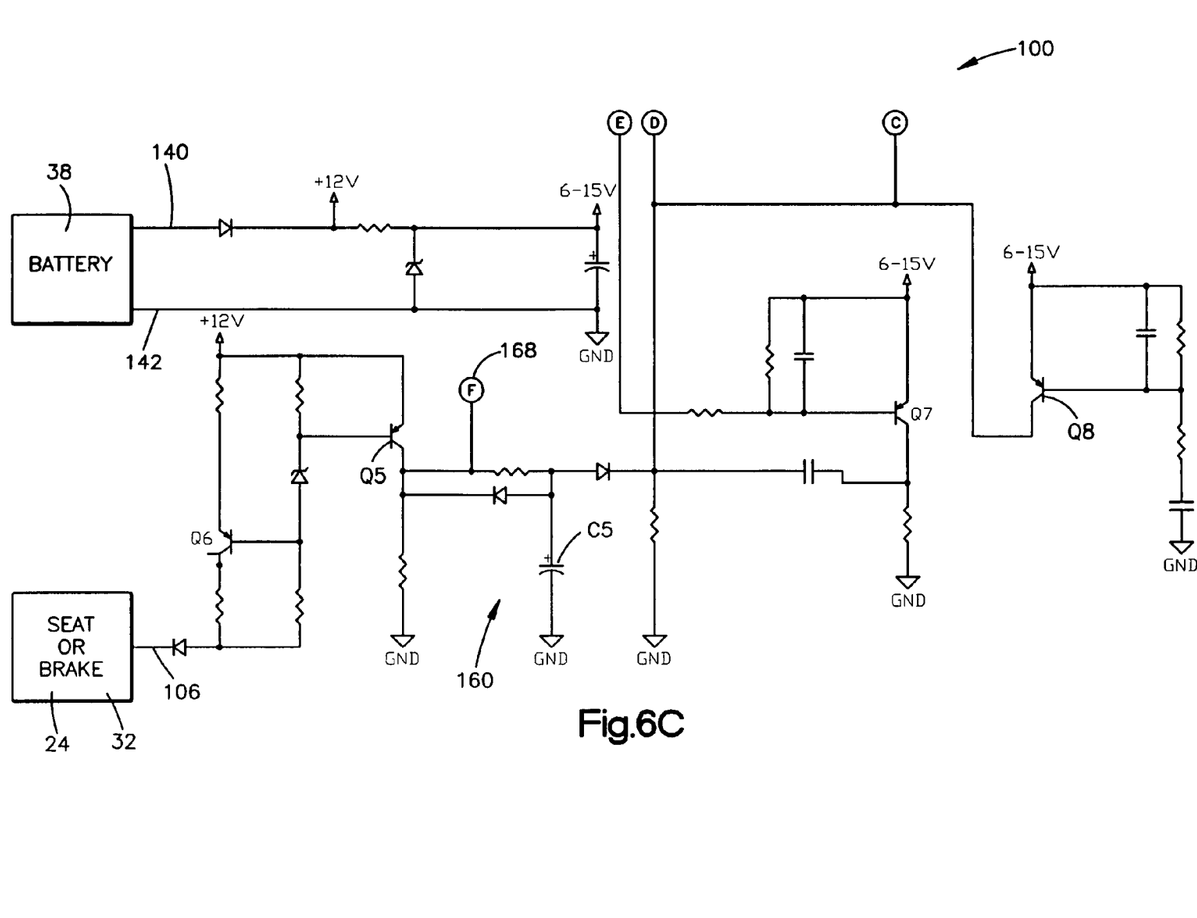

FIGS. 6A, 6B, and 6C disclose an override safety circuit 100 having three inputs 102, 104, 106 whose state is dictated by the status of three tractor switches. A first input 102 is coupled to the reverse switch 26. When the user moves the lever 27 to a reverse position, the input 102 is grounded. Grounding the input 102 turns on a transistor Q1, which in turn pulls a collector output 110 of the transistor high. In a non-override situation, this high output from the transistor Q1 will be coupled through a diode 112 (FIG. 5B) to a gate input 114 of a triac 116, which turns the triac on. When the circuit 100 is used with a manual pto clutch, the triac 116 is coupled through a PTO clutch switch 117 to an engine magneto 118. A clutch engagement lever controls the open or closed state of this switch When the clutch is manually engaged to actuate the mowing blades, the switch 117 is closed. If the reverse switch is closed, the triac 116 conducts and pulls the magneto to ground thereby shutting off the engine and disabling mowing in reverse. As described below, this shorting of the magneto to ground can be overridden, however, by proper actuation of two override switches.

Directly beneath the triac 116 for use with the manual clutch version of the circuit 100 is an electric clutch disable portion of the circuit. This circuit deactivates the electric clutch by activating a relay. The high signal at the collector output 110 turns on a transistor Q9, pulling one side of the relay coil 119 to ground to disengage the electric clutch.

The circuit 100 includes two flip-flop circuits 120, 122 (FIG. 6A), which are conditioned in response to various tractor switch inputs. The right most flip-flop 120 has a clock input coupled to a push button switch 130. When the push button switch is closed, a clock input to the right most flip-flop 120 goes high transmitting the input at pin D1 of that flip-flop 120 to the Q1 output. When a high output is clocked through the flip-flop 120, (to the Qj1 output) a transistor 132 (FIG. 6B) is turned on causing a light-emitting diode 134 to conduct and also pulling low a junction 136 to a low state. This junction 136 is also coupled to the collector output 110 from the transistor Q1 coupled to the reverse input 102 from the transmission switch. Dropping of the voltage at the junction 136 inhibits activation of the triac 116 (manual clutch) in response to closure of the reverse transmission switch thereby allowing continued operation with the clutch engaged. Similarly a low voltage at the junction 136 also prevents energization of the relay coil 119 for disengaging the electric clutch coil in tractors having electronic clutches. It is therefore seen that depending on the state of the input D1 to the flip-flop 120, when the push button switch 130 is activated, the mow in reverse override is implemented. If the proper sequence of conditions occur the override state is achieved regardless of whether the pto is engaged and the pto can be engaged while moving the tractor in reverse so long as the override switches are first activated in order before the tractor is shifted to reverse Upon power up of the circuit, a power on reset (high signal) is coupled to both flip-flops 120, 122. This is achieved by a turn on of a transistor Q8 thereby assuring that the output from the Q1 output of the flip-flop 120 is initially low and thereby assuring the override feature has not been set. Turning to the other flip-flop 122, the D2 input to this flip-flop 122 is coupled to a voltage source (derived from tractor battery at inputs 140, 142, FIG. 6C). Receipt of a low to high transition signal at a clock input 150 transmits a high output at the Q2 output of the flip-flop 122.

When the ignition switch 28 is turned to the override position 81, the input 104 goes low turning off a normally on transistor Q3. When the transistor Q3 is conducting, a connection 152 coupled to the D1 of the flip flop 120 is held low. When the transistor Q3 turns off a low-to-high transition occurs at the clock input 150 to the flip flop 122 and the Q2 output from this flip flop goes high. This causes the D1 input to the second flip-flop to be pulled high. Subsequent closure of the pushbutton switch 130 will clock a high output to the flip flip output Q1 to activate the override state to allow mowing in reverse for example.

The override state can be reset or turned off in three ways. One is by getting off the seat (electronic clutch, or activating the brake for manual clutch) causing the input 106 to go low. In the electric clutch version, the seat switch causes the input 106 to go low and the manual clutch version the brake causes the input 106 to go low. These two examples of control of the state of the input 106 are illustrative, and other signal conditioning mechanisms are certainly possible to control this state. Since in the manual clutch version, getting off the seat does not reset the override, a separate circuit (not shown) disables the engine should the users leave the seat. After an appropriate time delay implemented by a one-half second delay circuit 160, a reset input (high) is coupled to both flip-flops. The delay is dictated by a charge time of a capacitor C5 through a conducting transistor Q5.

A second reset occurs if the ignition switch is turned to off thereby deactivating the circuit so that upon the next activation of the circuit, the power up reset transistor Q8 again resets both flip-flops. The third mechanism for resetting is to switch the ignition switch from the mow in reverse position to the run position or normal mowing position. This causes the transistor Q3 coupled to the override input 104 to turn on pulling a base input to the transistor Q7 low to turn the transistor Q7 on and thereby couple a high pulse to the reset input to both flip-flops 120, 122. To again put the tractor in reverse override requires switching to the run with override position 81 of the ignition switch as well as activation of the push button switch 130.

Note, an input 168 from seat switch input 106 is coupled to electric clutch deactivation portion of circuit to automatically disengage the electric clutch when the operator gets off the seat. The input 168 goes high when the seat switch grounds the input 106 and this high signal turns on the transistor Q9 discussed above.

For the manual clutch systems, the override is reset when the parking brake is set, not when the operator leaves the seat. Other circuitry, not shown, kills the engine when the operator leaves the seat with the blades on. One side effect is that the triac 116 kills the engine if the parking brake is set with the blades on as indicated by the closed pto switch 117. In systems wishing to allow continued blade operation with the brake on, an additional bypass input 170 is grounded for the manual clutch version of the circuit 100. Grounding this input 170 prevents the parking brake switch from killing the engine when the blades are on. When the input 168 goes high the grounded bypass input 170 prevents this signal from turning on the triac 114. The input 170 is left floating on electric clutch units. This allowed a single circuit design to work with electric and manual clutch units.

Table 1 is a truth table for operating states of the circuit 100 for the electric clutch version. In this table the acronym MIRO stands for mow in reverse override.

TABLE 1 for circuit functionality

| Key switch position | SEAT Switch | REVERSE Switch | Pushbutton Switch | Outputs (MAGNETO and RELAY) |
|---|---|---|---|---|
| Pos 2 (from Pos 3) | Occupied | Reverse | Unpressed (Low) | Low Outputs |
| Pos 2 (from Pos 3) | Occupied | Reverse | Unpressed to Pressed | Enables MIRO, thus mowing in reverse allowed |
| Pos 2 (from Pos 3) | Occupied | Forward | Unpressed) (Low) | Mowing allowed; MIRO is not enabled |
| Pos 2 (from Pos 3) | Occupied | Forward | Unpressed to Pressed | Enables MIRO, thus mowing in reverse allowed |
| Pos 2 (from Pos 3) | Empty | Reverse | Unpressed (Low) | Low Outputs |
| Pos 2 (from Pos 3) | Empty | Reverse | Unpressed to Pressed | Low Outputs |
| Pos 2 (from Pos 3) | Empty | Forward | Unpressed (Low) | Low Outputs |
| Pos 2 (from Pos 3) | Empty | Forward | Unpressed to Pressed | Low Outputs |
| Position 1, 3, or 4 | Occupied | Reverse | Unpressed (Low) | Low Outputs |
| Position 1, 3, or 4 | Occupied | Reverse | Unpressed to Pressed | Low Outputs |
| Position 1, 3, or 4 | Occupied | Forward | Unpressed (Low) | Mowing allowed; cannot enable MIRO |
| Position 1, 3, or 4 | Occupied | Forward | Unpressed to Pressed | Mowing allowed; cannot enable MIRO |
| Position 1, 3, or 4 | Empty | Reverse | Unpressed (Low) | Low Outputs |
| Position 1, 3, or 4 | Empty | Reverse | Unpressed to Pressed | Low Outputs |
| Position 1, 3, or 4 | Empty | Forward | Unpressed (Low) | Low Outputs |
| Position 1, 3, or 4 | Empty | Forward | Unpressed to Pressed | Low Outputs |

The gasket or membrane 86 which overlies the printed circuit board is an elastomer material, most preferably a liquid silicone gasket material that is molded. Other rubber materials are also suitable for use in the membrane The gasket prevents water seepage into the region of the circuit board. On its inner layer (facing the printed circuit board) the gasket 86 supports a electrically conductive round carbon pill. The carbon pill is added to the mold with the liquid silicone as the gasket is formed and upon cooling of the elastomer the carbon pill adheres to the elastomer material to form an actuator region 200. When the user presses against the region of the gasket 93 through the cutout in the module 50 this carbon actuator region 200 bridges conductive traces 202, 204 that terminate in a pattern 206 on the printed circuit board to close the switch 130. In the illustrated embodiment the portion of the membrane 86 overlying the actuation region is orange and the portion of the membrane overlying the LED 134 is translucent.

Although the present invention has been described with a degree of particularity, it is the intent that the invention include all modifications and alterations falling within the spirit or scope of the appended claims.

The invention claimed is:

1. An ignition module for use with a lawn tractor having an engine and a power take off driven implement; said ignition module comprising:
   a housing that mounts to a tractor dashboard having a cutout for accessing a housing interior;
   an ignition switch supported by the housing:
   an inhibit circuit component for preventing operation of a power take off driven implement with the tractor in reverse;
   an override circuit component that allows operation of a power take off driven implement while the lawn tractor is in reverse after the override switch is actuated by a tractor operator;
   a substrate for supporting said inhibit circuit and said override circuit components within the housing interior; and
   an override switch comprising:
      a pair of contacts mounted to said substrate within the housing that form a part of the override circuit component, a switch actuator overlying the cutout of said housing, and a conductor for selective bridging said contacts in response to user actuation of the switch actuator.

2. The apparatus of claim 1 additionally comprising an indicator supported by said substrate to indicate a status of the override circuit component.

3. The apparatus of claim 1 comprising a second override switch electrically coupled to the override circuit component and further wherein the ignition switch controls a state of the second override switch.

4. The module of claim 1 wherein the switch actuator comprises a flexible gasket positioned with respect to the contacts.

5. Apparatus for use with a lawn tractor having an engine and a power take off driven implement; said apparatus comprising:
   a housing that mounts to a tractor dashboard having a housing cutout for accessing a housing interior;
   an inhibit circuit component for preventing operation of a power take off driven implement with the tractor in reverse;
   an override switch, said override switch comprising a flexible gasket overlying the cutout of the housing including a generally planar layer of conductive material affixed to the flexible gasket;
   an override circuit component that allows operation of a power take off driven implement while the lawn tractor is in reverse after the override switch is activated by a tractor operator; and
   a printed circuit board situated within the housing interior for supporting said inhibit circuit component and the override circuit component, said printed circuit board comprising a plurality of conductive traces located near the housing cutout, said conductive traces coupled to the override circuit and being selectively bridged by the conductive material due to flexing of the flexible gasket by the user to activate the override switch.

6. The module of claim 4 wherein the flexible gasket supports a layer of conductive material that bridges said contacts.

* * * * *